(12) United States Patent
Fujita et al.

(10) Patent No.: US 12,525,891 B2
(45) Date of Patent: Jan. 13, 2026

(54) ELECTRONIC DEVICE

(71) Applicant: DENSO CORPORATION, Kariya (JP)

(72) Inventors: Toshihiro Fujita, Kariya (JP); Atsushi Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 200 days.

(21) Appl. No.: 18/467,714

(22) Filed: Sep. 14, 2023

(65) Prior Publication Data

US 2024/0007016 A1 Jan. 4, 2024

Related U.S. Application Data

(63) Continuation of application No. PCT/JP2022/010065, filed on Mar. 8, 2022.

(30) Foreign Application Priority Data

Mar. 18, 2021 (JP) .................. 2021-045122

(51) Int. Cl.
*H02M 7/00* (2006.01)
*H01H 47/00* (2006.01)
*H05K 7/14* (2006.01)

(52) U.S. Cl.
CPC ............ *H02M 7/003* (2013.01); *H01H 47/00* (2013.01); *H05K 7/1457* (2013.01)

(58) Field of Classification Search
None
See application file for complete search history.

(56) References Cited

U.S. PATENT DOCUMENTS 10,050,493 B2 * 8/2018 Kabune ..................... H02K 9/00
11,014,602 B2 * 5/2021 Wada .................. H02M 7/5387
2010/0226160 A1 * 9/2010 Prior ..................... H01H 47/002
361/170
2014/0151146 A1 * 6/2014 Tanaka ................. B62D 5/0406
180/443
2020/0023886 A1   1/2020 Yatsugi et al.
2020/0108859 A1 * 4/2020 Tashima .................. H01L 23/36
2020/0366169 A1 * 11/2020 Sugiura ............... H02K 11/215
2021/0371006 A1 * 12/2021 Ichikawa ............. H02K 11/215
2022/0247283 A1   8/2022 Miyachi et al.

FOREIGN PATENT DOCUMENTS

WO        2022/138068 A1    6/2022

OTHER PUBLICATIONS

U.S. Appl. No. 18/467,716, filed Sep. 25, 2023 titled "Semiconductor Module, and Electronic Device Having the Same"; 45 pages.

* cited by examiner

*Primary Examiner* — Courtney L Smith
(74) *Attorney, Agent, or Firm* — Maschoff Brennan

(57) ABSTRACT

An electronic device includes an upper and lower arm module including an upper arm element and a lower arm element as one module, a relay module including one relay element that switches connection and disconnection between the upper and lower arm module and an output terminal, and a peripheral component including at least one of a current detection element and a noise removal element. The upper and lower arm module, the relay module and the output terminal are arranged in this order along a direction from a centerline of the substrate toward an outer end of the substrate on a same surface of a substrate. The peripheral component is arranged side by side with the relay module in a region between the upper and lower arm module and the output terminal.

10 Claims, 14 Drawing Sheets

ELECTRONIC DEVICE

CROSS REFERENCE TO RELATED APPLICATIONS

The present application is a continuation application of International Patent Application No. PCT/JP2022/010065 filed on Mar. 8, 2022, which designated the U.S. and claims the benefit of priority from Japanese Patent Application No. 2021-045122 filed on Mar. 18, 2021. The entire disclosures of all of the above applications are incorporated herein by reference.

TECHNICAL FIELD

The present disclosure relates to an electronic device.

BACKGROUND

Conventionally, a mechanically and electrically integrated electric driving device has been known. For example, there is an electric driving device in which a power conversion circuit is made redundant, and a positive electrode side power supply path and a negative electrode side power supply path are disposed adjacent to each other.

SUMMARY

The present disclosure describes an electronic device. According to an aspect of the present disclosure, an electronic device includes: an upper and lower arm module including an upper arm element and a lower arm element as one module; a relay module including one relay element that switches connection and disconnection between the upper and lower arm module and an output terminal; and a peripheral component including at least one of a current detection element and a noise removal element. The upper and lower arm module, the relay module and the output terminal are arranged in this order along a direction from a centerline of the substrate toward an outer end of the substrate on a same surface of a substrate. At least a part of the peripheral component is arranged side by side with the relay module in a region between the upper and lower arm module and the output terminal.

BRIEF DESCRIPTION OF DRAWINGS

Objects, features and advantages of the present disclosure will become more apparent from the following detailed description made with reference to the accompanying drawings, in which.

DETAILED DESCRIPTION

For example, there is an electric driving device in which a high potential MOSFET, a low potential MOSFET, and a phase relay MOSFET are individually packaged, so that a drive circuit unit occupies a large area on a substrate.

The present disclosure provides an electronic device which is capable of reducing an area occupied by elements constituting a drive circuit including a peripheral element such as a current detection element on a substrate.

According to an aspect of the present disclosure, an electronic device includes an upper and lower arm module, a relay module, a peripheral component and a substrate. The upper and lower arm module includes an upper arm element and a lower arm element, which constitute a same phase of an inverter circuit and are configured as one module. The relay module includes one relay element that switches connection and disconnection between the upper and lower arm module and the output terminal. The peripheral component includes at least one of a current detection element and a noise reduction element. The upper and lower arm module, the relay module and the peripheral component are mounted on the substrate.

The upper and lower arm module, the relay module, the output terminal are arranged in this order along a direction from a centerline of the substrate to an outer end of the substrate on a same surface of the substrate. At least a part of the peripheral component is arranged side by side with the relay module in a region between the upper and lower arm module and the output terminal. Accordingly, an occupation area of the inverter circuit and a peripheral circuit on the substrate can be reduced.

Hereinafter, embodiments of an electronic device of the present disclosure will be described with reference to the drawings. In the following description of the embodiments, substantially the same parts will be denoted by the same reference numbers, and descriptions thereof will not be repeated.

First Embodiment

Hereinafter, an electronic device will be described with reference to the drawings. In the following description of the embodiments, substantially the same parts will be denoted by the same reference numbers, and descriptions thereof will not be repeated. An electronic control unit according to a first embodiment is shown in FIGS. 1 to 9.

Figure 1:
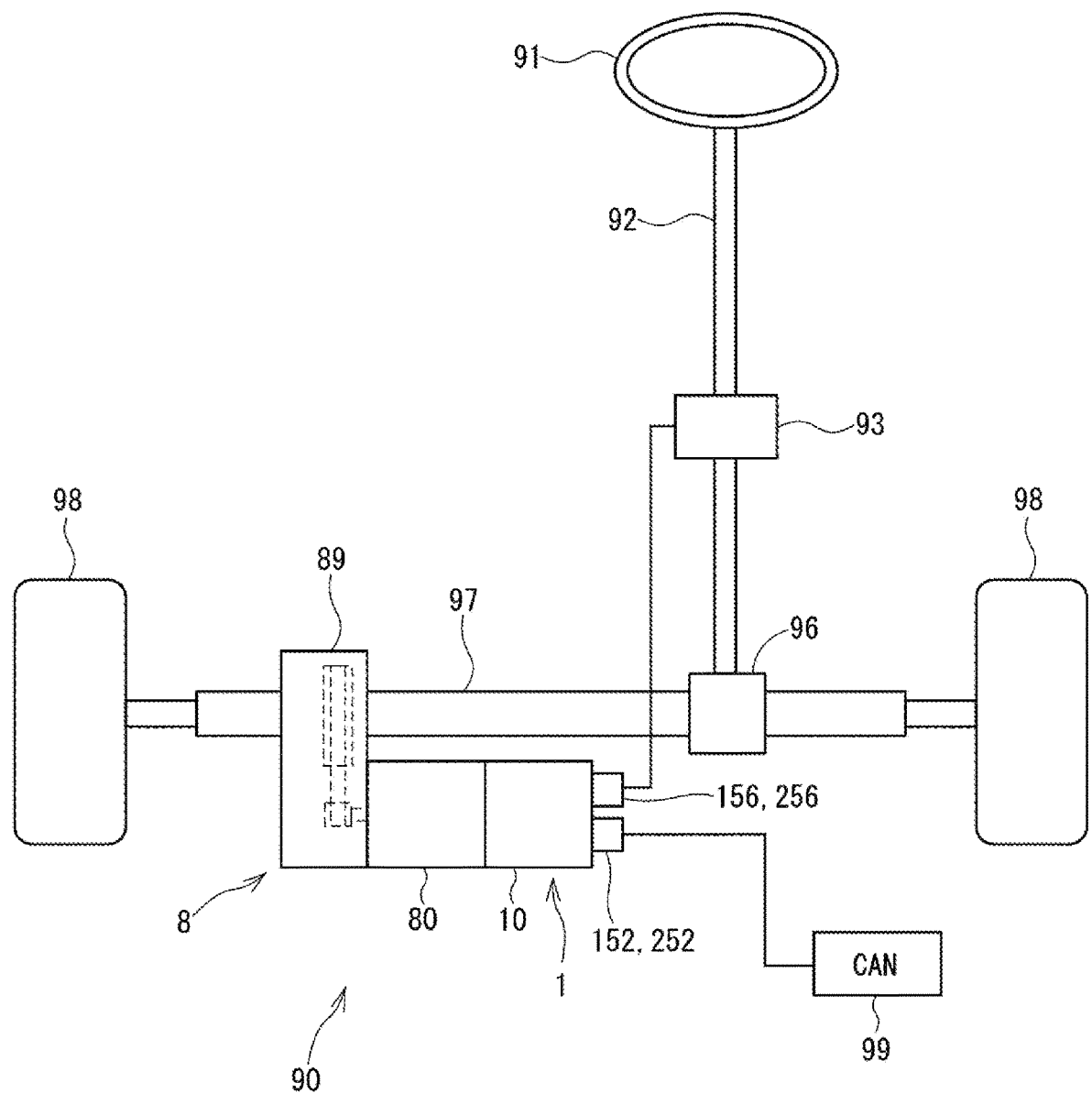
FIG. 1 is a diagram illustrating a schematic structural view of a steering system according to a first embodiment.
Figure 2:
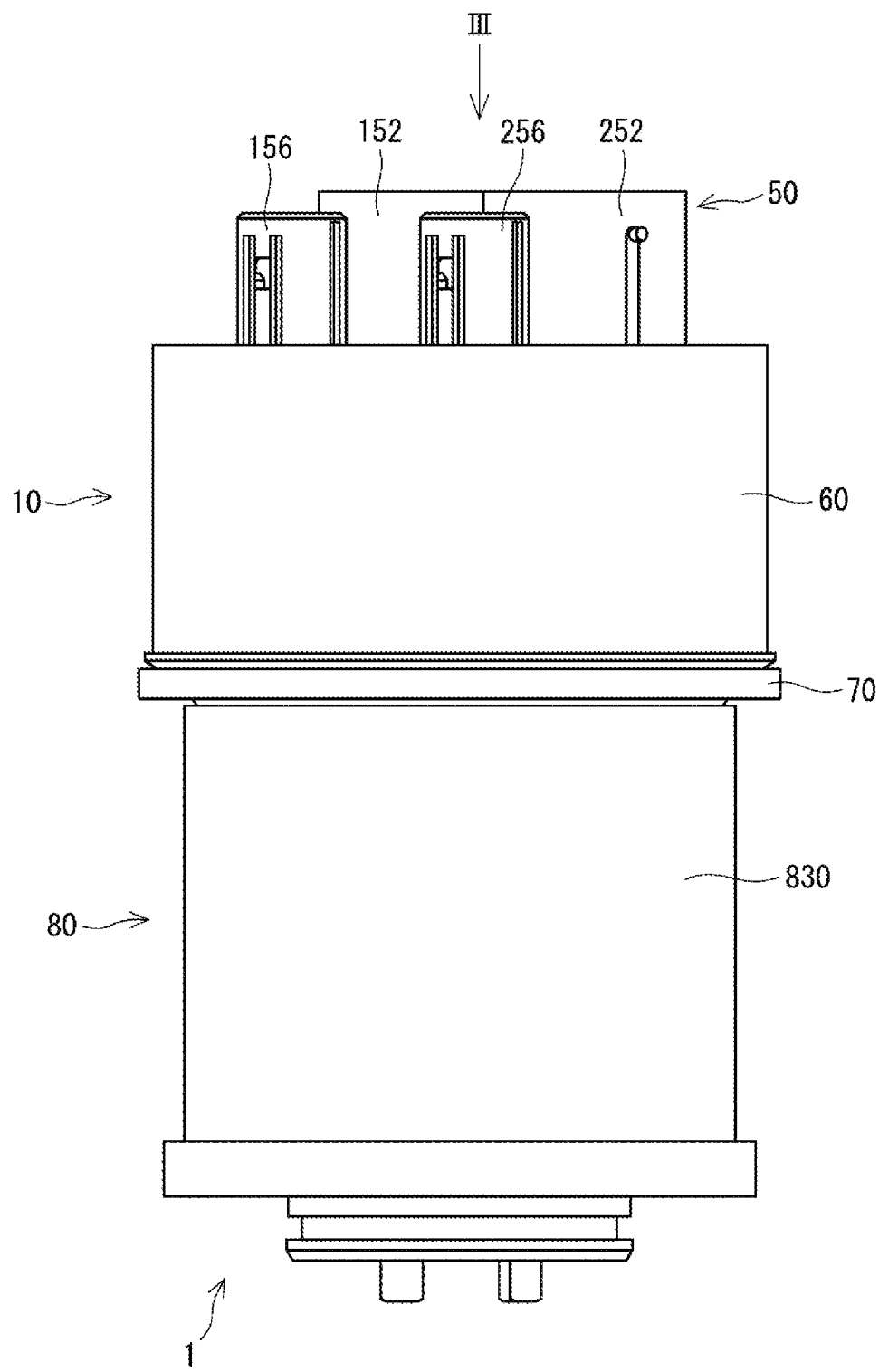
FIG. 2 is a diagram illustrating a side view of a driving device according to the first embodiment.
Figure 3:
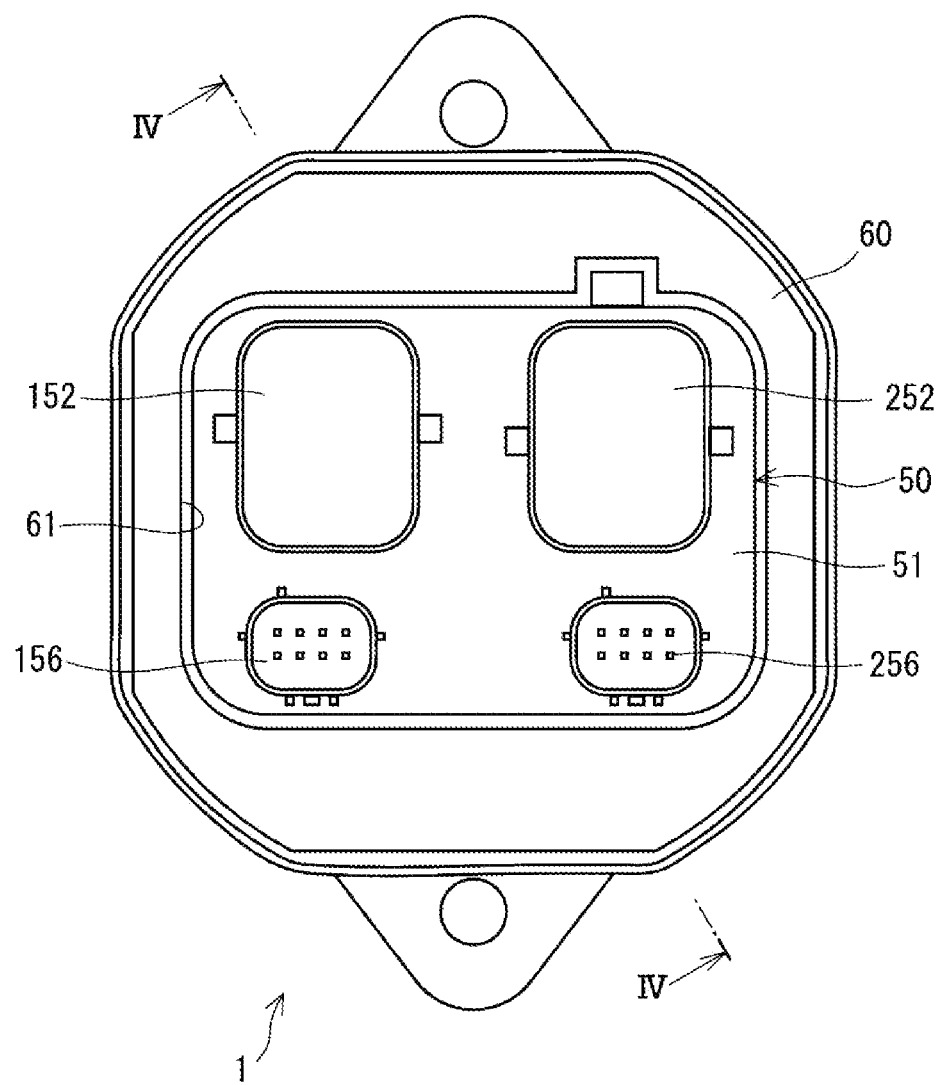
FIG. 3 is a diagram illustrating an end view of the driving device when viewed in a direction along an arrow III in FIG. 2.
Figure 4:
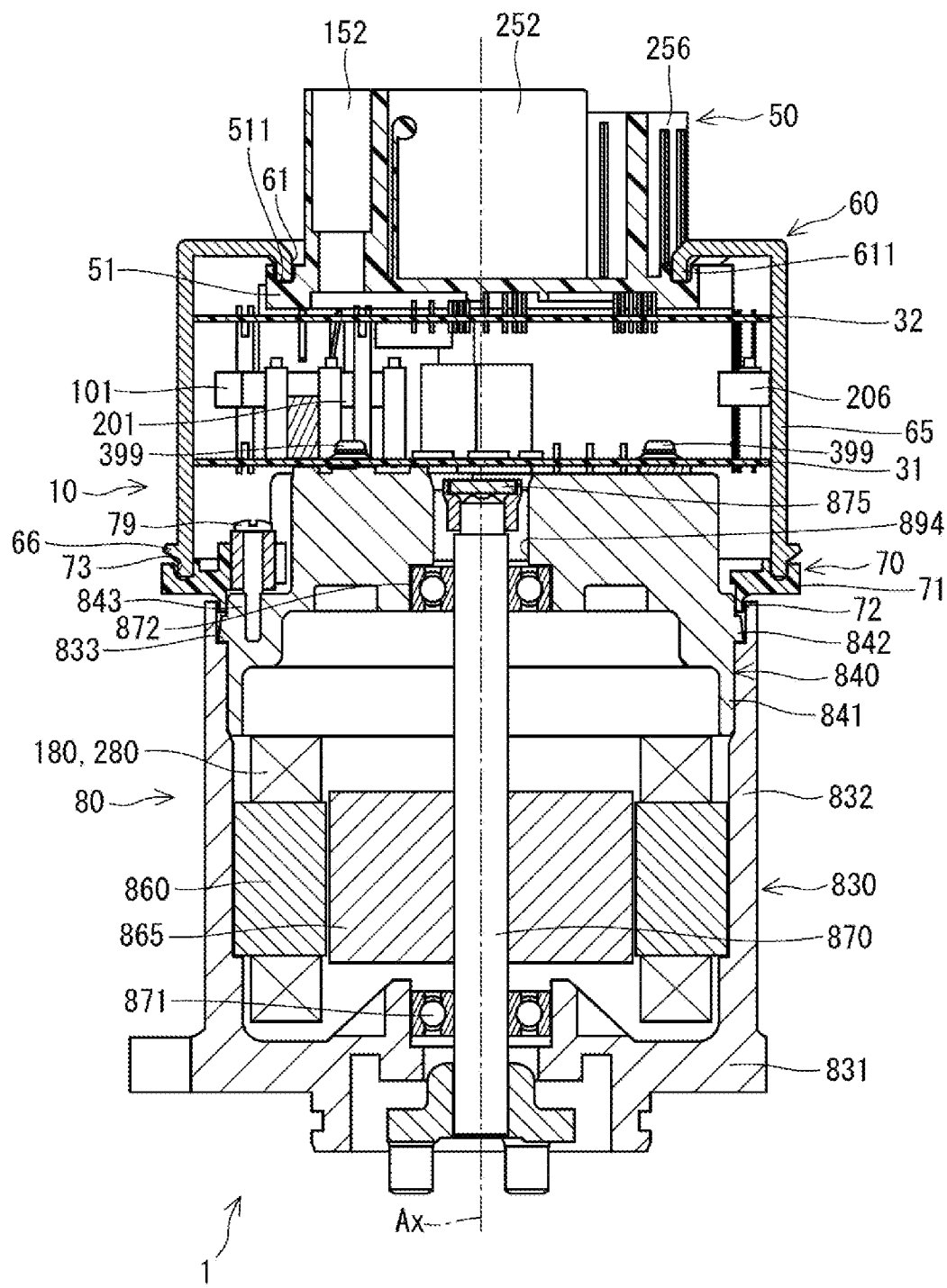
FIG. 4 is a diagram illustrating a cross-sectional view taken along a line IV-IV of FIG. 3.
Figure 5:
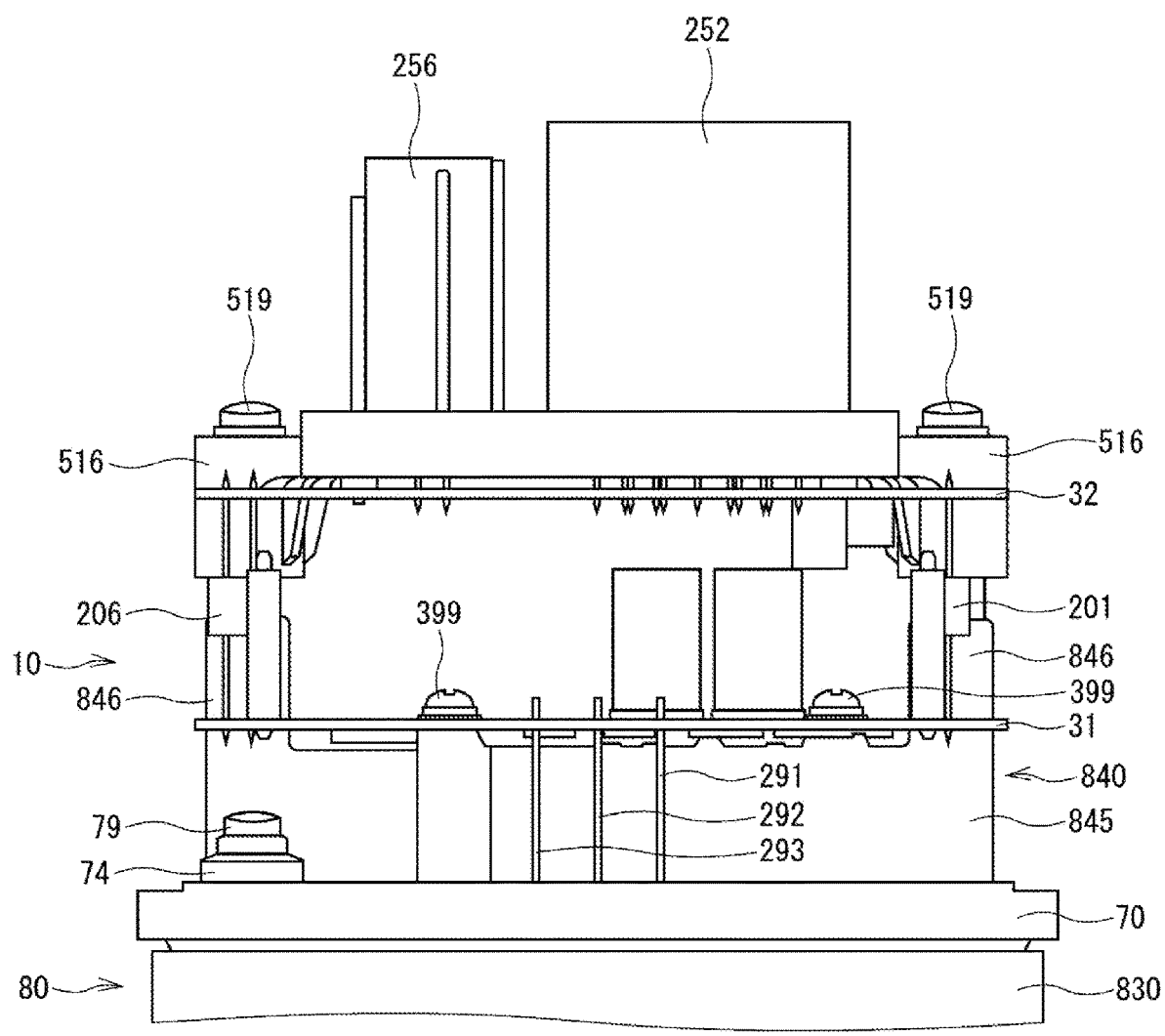
FIG. 5 is a diagram illustrating a side view of an ECU, from which a cover is removed, according to the first embodiment.

As shown in FIG. 1, a driving device 1 includes a motor 80 and an electronic control unit (ECU) 10, and is applied to an electric power steering device 8, which is a steering device for assisting a steering operation of a vehicle. FIG. 1 shows an overall configuration of a steering system 90 including the electric power steering device 8. The steering system 90 includes a steering wheel 91 which is a steering member, a steering shaft 92, a pinion gear 96, a rack shaft 97, road wheels 98 and the electric power steering device 8.

The steering wheel 91 is connected to the steering shaft 92. A torque sensor 93 is provided on the steering shaft 92 to detect a steering torque. The torque sensor 93 internally has two systems, and outputs respective detection values to corresponding connectors 156 and 256. The pinion gear 96 is provided at an axial end of the steering shaft 92. The pinion gear 96 engages with the rack shaft 97. The pair of road wheels 98 is connected to both ends of the rack shaft 97 through tie rods or the like.

When a driver rotates the steering wheel 91, the steering shaft 92 connected to the steering wheel 91 rotates. A rotational motion of the steering shaft 92 is converted into a linear motion of the rack shaft 97 by the pinion gear 96. The pair of road wheels 98 is steered to an angle corresponding to a displacement amount of the rack shaft 97.

The electric power steering device 8 includes the driving device 1, a reduction gear 89 as a power transmission unit that reduces the rotation of the motor and transmits the rotation to the rack shaft 97, and the like. The electric power steering device 8 of the present embodiment is a so-called "rack assist type", but may be a so-called "column assist type" or the like that transmits the rotation of the motor to the steering shaft 92.

As shown in FIGS. 2 to 5, the motor 80 is a three-phase brushless motor. The motor 80 outputs part or all of a torque required for steering, and is driven by a power supplied from a battery (not shown) to rotate the reduction gear 89 forward and backward. The motor 80 has a first motor winding 180 and a second motor winding 280.

Hereinafter, a combination of configurations relating to the energization control of the first motor winding 180 will be referred to as a first system, and a combination of configurations relating to the energization control of the second motor winding 280 will be referred to as a second system. The configurations of the first system are mainly numbered in the 100s, and the configurations of the second system are mainly numbered in the 200s. Also the configurations that functions substantially the same between the first system and the second system are numbered so that the lower 2 digits are common, and thus the description thereof will be simplified. As appropriate, an index of "1" is added to a component related to the first system, and an index of "2" is added to a component related to the second system.

In the driving device 1, the ECU 10 is integrally provided on one side in an axial direction of the motor 80. That is, the driving device 1 is provided as a mechanically and electrically integrated type. The motor 80 and the ECU 10 may alternatively be placed separately. The ECU 10 is positioned coaxially with an axis Ax of a shaft 870 on the side opposite to the output shaft of the motor 80. Here, in the meaning "coaxially", errors and deviations related to assembly and design are allowed, for example. A "mechanical and electrical integration" of the driving device 1 of the present embodiment is different from a structure in which, for example, a substantially rectangular parallelepiped ECU is simply placed close to the motor 80. By adopting the mechanically and electrically integrated type, it may be possible to efficiently position the ECU 10 and the motor 80 in a vehicle having a limited mounting space. Hereinafter, the axial direction of the motor 80 will be regarded as an axial direction of the driving device 1, and simply referred to as "axial direction".

The motor 80 has a motor case 830, a motor frame 840, a stator 860, a rotor 865, and the like. The stator 860 is fixed to the motor case 830 and has the motor windings 180 and 280 wound thereon. The rotor 865 is provided radially inside the stator 860 and is provided rotatably relative to the stator 860.

The shaft 870 is fitted firmly in the rotor 865 to rotate integrally with the rotor 865. The shaft 870 is rotatably supported by the motor case 830 and the motor frame 840 by the bearings 871 and 872. An end portion of the shaft 870 on the ECU 10 side is inserted through a shaft hole 894 formed in the motor frame 840 and exposed on the ECU 10 side. A magnet 875 is placed at the end portion of the shaft 870 on the ECU 10 side.

The motor case 830 has a substantially bottomed tubular shape including a bottom portion 831 and a tubular portion 832, and the ECU 10 is provided adjacent to an opening of the motor case 830. The bearing 871 is provided at the bottom portion 831. The stator 860 is fixed to the tubular portion 832.

The motor frame 840 has a frame portion 841, a heat sink 845, a connector connection portion 846, and the like, and is made of a material with good thermal conductivity such as aluminum. The frame portion 841 is press-fitted radially inward of the motor case 830, and as a whole is within a projected area (hereinafter referred to as "motor silhouette" as appropriate) obtained by projecting the tubular portion 832 of the motor case 830 in the axial direction. A flange portion 842 is formed on the outer periphery of the frame portion 841 and is in contact with a stepped portion 833 formed on the inner wall of the tubular portion 832. An extension member connection portion 843 is formed outside the heat sink 845 of the frame portion 841.

The connector connection portion 846 is erected substantially at a center of the side surface of the heat sink 845 on a side from which the motor windings 180 and 280 are not taken out. The height of the connector connection portion 846 is higher than that of the heat sink 845.

The ECU 10 has a main substrate 31, a sub substrate 32, power system connection components 101 and 201, signal system connection components 106 and 206, a connector unit 50, a cover 60, and the like. The main substrate 31 is fixed to the heat sink 845 by a fastening member 399 such as a screw. The sub substrate 32 is fixed to the connector unit 50. The main and sub substrates 31 and 32 are larger than the heat sink 845 when projected in the axial direction, and are formed to extend to the outside of the heat sink 845.

Switching elements and the like constituting the inverter circuit are mounted on a surface 391 of the main substrate 31 facing the heat sink 845, and are provided so as to be able to dissipate heat to the heat sink 845. A component such as an aluminum electrolytic capacitor is mounted on a surface of the main substrate 31 opposite to the heat sink 845. The arrangement of components on the main substrate 31 will be described later.

On the sub substrate 32, components such as a choke coil and a capacitor constituting a filter circuit, and a communication driver are mounted. The main substrate 31 and the sub substrate 32 are connected through the power system connection components 101 and 201 and the signal system connection components 106 and 206. The power system connection components 101 and 201 are arranged side by side outside the element mounting region. The signal system connection components 106 and 206 are arranged side by side outside the element mounting region and on the opposite side to the power system connection components 101 and 201 across the element mounting region.

The connector unit 50 has a base portion 51, vehicle system connectors 152 and 252, and steering system connectors 156 and 256. The base portion 51 has a substantially rectangular shape in a plan view. A groove portion 511 is formed along the outer edge of the surface of the base portion 51 opposite to the motor 80. The base portion 51 is formed with fixing portions 516. Through bolts 519 are inserted through the fixing portions 516 and screwed to the connector connection portions 846 of the motor frame 840. The connector unit 50 is thereby fixed to the motor frame 840. A connection position in the axial direction between the connector connection portion 846 of the motor frame 840 and the fixing portion 516 of the connector unit 50 is located between the main substrate 31 and the sub substrate 32.

The connectors 152, 156, 252, and 256 are formed to have openings facing outward in the axial direction. The vehicle system connectors 152 and 252 are integrated-type hybrid connectors in which a power system connector connected to a vehicle power supply and a ground and a communication system connector connected to a vehicle communication network 99 (see FIG. 1) such as a controller area network (CAN) are integrated. The steering system connectors 156 and 256 are connected to the torque sensor 93.

The cover 60 has a substantially bottomed tubular shape, and accommodates the main substrate 31, the sub substrate 32, the heat sink 845 and the like therein. A substantially rectangular hole 61 is formed at the bottom of the cover 60. The connectors 152, 156, 252, and 256 are inserted through the hole 61. An end portion 611 of the hole 61 is bent inward. The end portion 611 is inserted into the groove portion 511 of the connector unit 50, in which an adhesive member such as an adhesive is deposited. As a result, it is possible to suppress water droplets and dust from entering between the connector unit 50 and the cover 60.

In the present embodiment, the base portion 51 has four openings of the vehicle system connectors 152 and 252 and the steering system connectors 156 and 256, and the base portion 51 protrudes from a projection region in which the tubular portion 832 of the motor case 830 is projected in the axial direction. In other words, the connector unit 50 is not within the motor silhouette.

The expansion member 70 includes a base portion 71, an annular protrusion 72, a cover insertion groove 73, a fixing portion 74, and the like, and is integrally formed of resin or the like. The extension member 70 is formed in an annular shape as a whole, and is arranged on the ECU 10 side of the frame portion 841 of the motor frame 840 and radially outside the heat sink 845. In other words, the heat sink 845 is formed on the inner peripheral side of the extension member 70 so as to protrude toward the ECU 10. At least a part of the outer edge of the extension member is located outside the motor silhouette.

The annular protrusion 72 is provided on the surface of the base portion 71 on the motor 80 side so as to protrude along the inner peripheral surface of the base portion 71, and is inserted into the tubular portion 832 of the motor case 830. The cover insertion groove 73 is formed along the outer edge of the surface of the extension member 70 opposite to the motor 80. An end portion of the cover 60 on the opening side is inserted into the cover insertion groove 73 to which an adhesive member such as an adhesive material is applied. As a result, it is possible to suppress water droplets, dust, and the like from entering between the expansion member 70 and the cover 60. The fixing portion 74 is formed to protrude radially inward from an inner peripheral wall of the extension member 70. A collar is inserted into the fixing portion 74 and fixed to the frame portion 841 with a screw 79.

Figure 6:
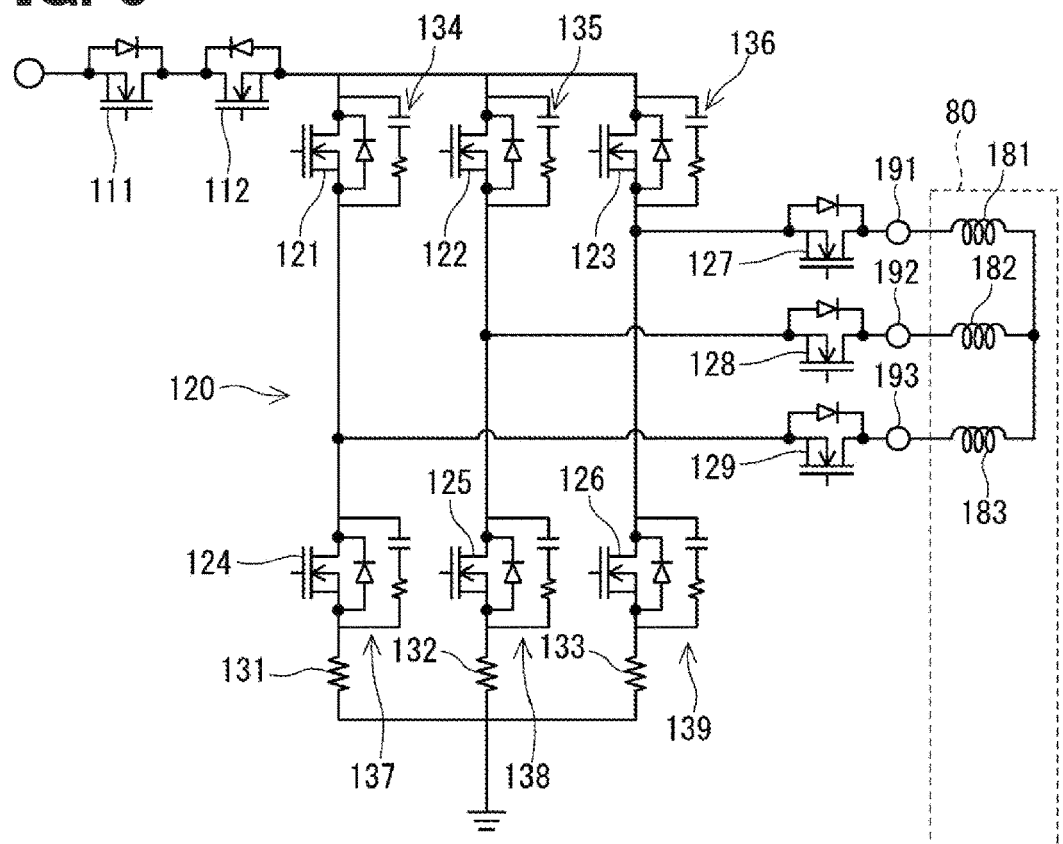
FIG. 6 is a circuit diagram of a driving device according to the first embodiment.
Figure 6:
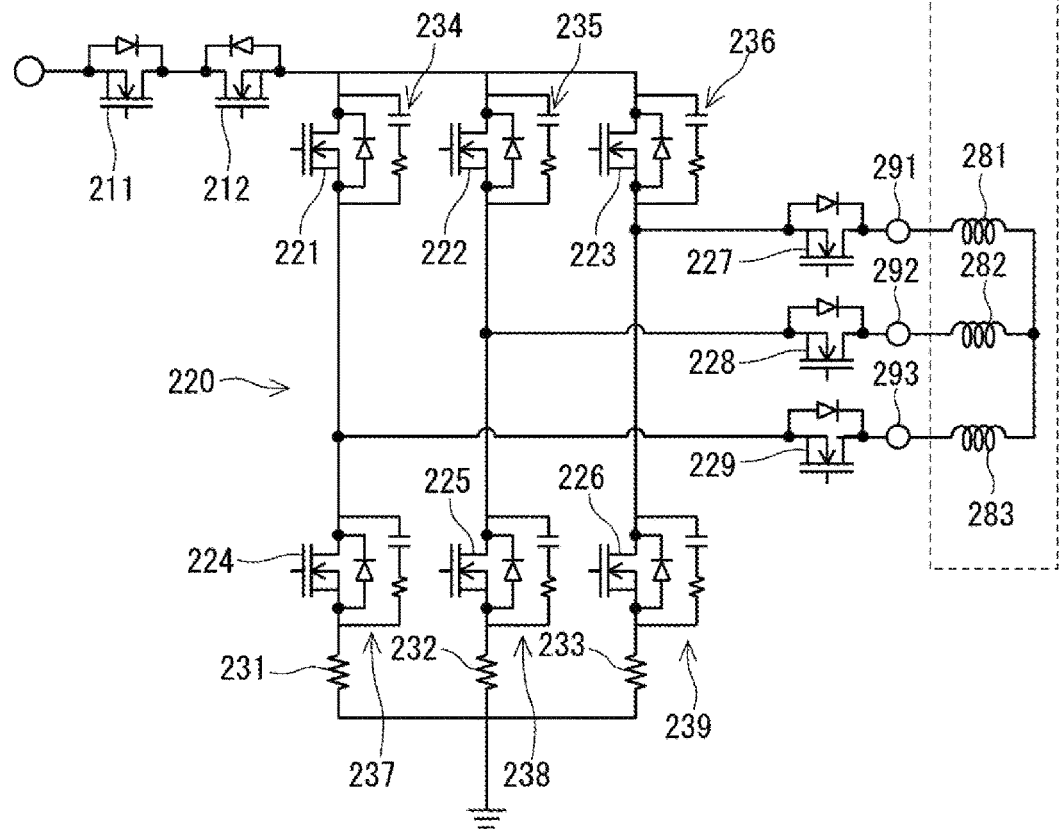

A circuit configuration of the driving device 1 is shown in FIG. 6. In the present embodiment, since the circuit configuration of the first system and the circuit configuration of the second system are the same, the first system will be described, and the description of the second system will be omitted as appropriate.

The inverter circuit 120 is a three-phase inverter in which upper arm elements 121 to 123 connected to a high potential side and lower arm elements 124 to 126 connected to a low potential side are bridge-connected. The high potential side of the inverter circuit 120 is connected to a power supply such as a battery via power supply relay elements 111 and 112, and the low potential side of the inverter circuit 120 is connected to the ground.

A connection point between the upper arm element 121 and the lower arm element 124, which are paired and form a U-phase, is connected to one end of a U-phase winding 181 via a motor relay element 127 and a motor terminal 191. A connection point between the upper arm element 122 and the lower arm element 125, which are paired and form a V-phase, is connected to one end of a V-phase winding 182 via a motor relay element 128 and a motor terminal 192. A connection point between the upper arm element 123 and the lower arm element 126, which are paired and form a W-phase, is connected to one end of a W-phase winding 183 via a motor relay element 129 and a motor terminal 193. The other ends of the windings 181 to 183 are connected to each other.

Shunt resistors 131, 132, and 133 are provided on the low potential side of the lower arm elements 124, 125, and 126, respectively, as current detection elements for detecting the current of the corresponding phase of the motor winding 180. Snubber circuit elements 134 to 139 for noise reduction are, respectively, connected in parallel to the upper arm elements 121 to 123 and the lower arm elements 124 to 126. The snubber circuit elements 134 to 139 each include a capacitor and a resistor connected in series. Hereinafter, in order to distinguish the capacitor and the resistor of the snubber circuit element from each other as appropriate, in the drawings, the capacitor is denoted with a suffix "ca", and the resistor is denoted by a suffix "r" and shown with hatching.

Electric power is supplied to the inverter circuit 120 via the power supply relay elements 111 and 112. In the present embodiment, the upper arm elements 121 to 123, the lower arm elements 124 to 126, the motor relay elements 127 to 129, and the power supply relay elements 111 and 112 are all MOSFETs, but may be IGBTs, thyristors, or the like. The power supply relay elements 111 and 112 are connected in series such that the directions of the parasitic diodes are opposite to each other. This connection restricts a current from flowing in a reverse direction and protects the ECU 10 if the battery is incorrectly connected in the reverse direction.

Figure 7:
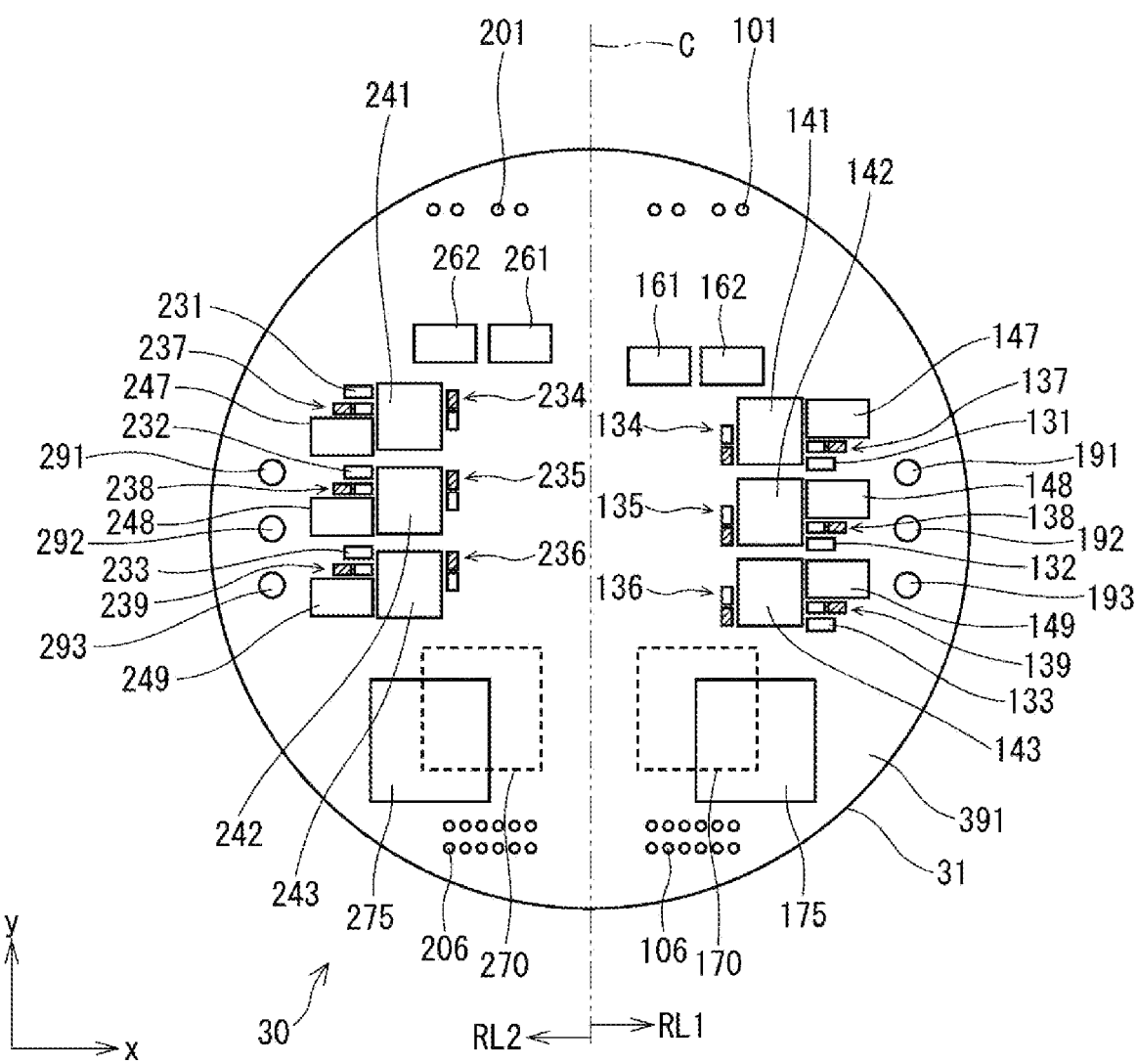
FIG. 7 is a diagram illustrating a plan view of a main substrate on a heat sink side according to the first embodiment.

FIG. 7 shows the surface 391 of the main substrate 31 facing the heat sink 845. As shown in FIG. 7, the electronic device 30 includes the main substrate 31 and various electronic components mounted on the main substrate 31. On the main substrate 31, the upper and lower arm modules 141 to 143 and 241 to 243, the relay modules 147 to 149 and 247 to 249, the shunt resistors 131 to 133, the snubber circuit elements 134 to 139 and 234 to 239, the power supply relay modules 161, 162, 261 and 262, the microcomputers 170 and 270, the integrated circuit components 175 and 275, and the like are mounted. Hereinafter, the main substrate 31 will be simply referred to as the "substrate" as appropriate. In FIG. 7, the hole portions to which the terminals are connected are appropriately denoted by reference numerals of corresponding members. Further, in FIG. 7, the illustration of the hole portion and the like related to the fastening member 399 is omitted, and the substrate 31 is shown in a circular shape. However, the shape of the substrate 31 is not limited to a circular shape, and may be different.

In the present embodiment, the upper arm element 121 and the lower arm element 124 of the U phase are packaged into one module, as an upper and lower arm module 141. Similarly, the upper arm element 122 and the lower arm element 125 of the V phase are packaged into one module, as an upper and lower arm modules 142. The upper arm element 123 and the lower arm element 126 of the W phase are packaged into one module, as an upper and lower arm modules 143.

In regard to the second system, similarly, the upper arm element 221 and the lower arm element 224 of the U phase are packaged into one module, as an upper and lower arm module 241. The upper arm element 222 and the lower arm element 225 of the V phase are packaged into one module, as an upper and lower arm module 242. The upper arm element 223 and the lower arm element 226 of the W phase are packaged into one module, as an upper and lower arm module 243. That is, each of the upper and lower arm modules 141 to 143 and 241 to 243 is a so-called "2-in-1 module" in which two elements are packaged.

Each of the motor relay modules 147 to 149 and 247 to 249 is a so-called "1-in-1 modules" in which each of the motor relay elements 127 to 129 and 227 to 229 is individually packaged. Each of the power supply relay elements 111 and 112 is provided in the 1-in-1 module, similar to the motor relay module 147. Semiconductor modules in which the power supply relay elements 111, 112, 211, and 212 are individually packaged are, respectively, referred to as power supply relay modules 161, 162, 261, and 262.

Two sets of the snubber circuit elements 134 to 139 and 234 to 239 are provided for each of the upper and lower arm modules 141 to 143 and 241 to 243. The snubber circuit elements 134 to 136 and 234 to 236, which are respectively connected in parallel with the upper arm elements 121 to 123 and 221 to 223, are arranged on a side adjacent to a substrate centerline C than the upper and lower arm modules 141 to 143 and 241 to 243. The snubber circuit elements 137 to 139 and 237 to 239, which are respectively connected in parallel with the lower arm elements 124 to 126 and 224 to 226, are arranged opposite to the substrate centerline C with respect to the upper and lower arm modules 141 to 143 and 241 to 243.

The substrate 31 is sectioned at the substrate centerline C into a first system region RL1 in which the components related to the first system are mounted and a second system region RL2 in which the components related to the second system are mounted. Here, a direction orthogonal to the substrate centerline C is defined as an x direction, and a direction along the substrate centerline C is defined as a y direction. Further, with respect to the y direction, a region where the power system connection components 101 and 201 are provided is referred to as a "power end portion", and a region where the signal system connection components 106 and 206 are provided is referred to as a "control end portion".

In the first system region RL1, the power system connection component 101, the power supply relay modules 161 and 162, the components related to the U-, V-, W-phases, the microcomputer 170 and the integrated circuit component 175, and the signal system connection component 106 are arranged in this order from the power end portion toward the control end portion. Similarly, in the second system region RL2, the power system connection component 201, the power supply relay modules 261 and 262, the components related to the U-, V-, W-phases, the microcomputer 270 and the integrated circuit component 275, and the signal system connection component 206 are arranged in this order from the power end portion toward the control end portion. The power supply relay modules 161 and 162 are arranged side by side such that the longitudinal direction thereof is along the x direction.

The upper and lower arm modules 141 to 143 are aligned substantially parallel to the substrate centerline C. The upper and lower arm modules 141 to 143, the motor relay module 147 to 149, and the motor terminals 191 to 193 are arranged in this order from the substrate centerline C toward an outer end of the substrate 31.

Figure 8:
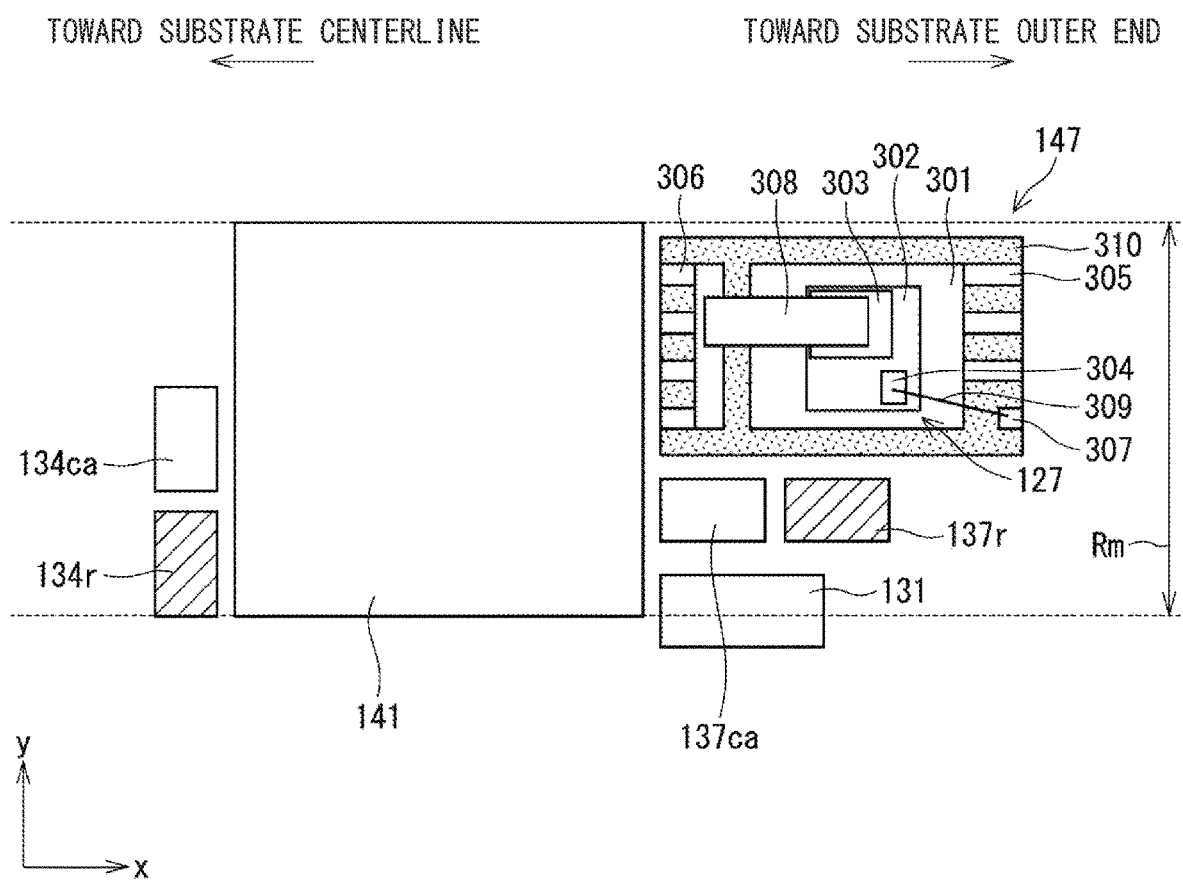
FIG. 8 is a diagram illustrating an arrangement of an upper and lower arm module, a motor relay module, a shunt resistor, and a snubber circuit element according to the first embodiment.

The element arrangement of each phase is shown in FIG. 8. In FIG. 8, the internal configuration of the motor relay module 147 is schematically illustrated, and the sealing portion 310 is illustrated with a textured surface for the sake of description. The same applies to the drawings relating to the embodiments, which will be described later. Since the U-phase, the V-phase, and the W-phase of the first system and the U-phase, the V-phase, and the W-phase of the second system have substantially the same element arrangement, the element arrangement of the U-phase of the first system will be mainly described as an example.

The upper and lower arm module 141 has a substantially square shape in a plan view. The motor relay module 147 has a substantially rectangular shape in a plan view in which the length of the long side is substantially equal to the length of one side of the upper and lower arm module 141 and the length of the short side is shorter than the length of one side of the upper and lower arm module 141. Here, when the y direction (that is, the vertical direction of the sheet of FIG. 8) is defined as a width direction, it can be said that the motor relay module 147 is formed to have a narrow width, that is, the motor relay module 147 has a smaller width than the upper and lower arm module 141.

The motor relay module 147 is disposed adjacent to the upper and lower arm module 141 such that the short side of the motor relay module 147 faces an outer end side of the upper and lower arm module 141. The outer end side of the upper and lower arm module 141 is the side of the upper and lower arm module 141 closer to the outer end of the substrate 31. In the present embodiment, since the width of the motor relay module 147 is smaller than the width of the upper and lower arm module 141, it is possible to secure a space for mounting components other than the motor relay module 147 in a module mounting region Rm which is defined by projecting the upper and lower arm module 141 in the x direction.

In regard to the first system, the motor relay module 147, the snubber circuit element 137, and the shunt resistor 131 are arranged in this order from the side adjacent to the power end portion toward the side adjacent to the control end portion, in an area adjacent to the outer end of the substrate 31 within the module mounting region Rm. On the other hand, in regard to the second system, the motor relay module 247, the snubber circuit element 237, and the shunt resistor 231 are arranged in this order from the side adjacent to the control end portion toward the side adjacent to the power end portion, in an area adjacent to the outer end of the substrate 31 within the module mounting region Rm (see FIG. 7). The shunt resistor 131 is arranged such that the longitudinal direction thereof is along the x direction.

The snubber circuit element 134 is arranged on the substrate centerline C side of the upper and lower arm module 141 such that the resistor 134r and the capacitor 134ca are arranged side by side in the y direction and the long sides of the resistor 134r and the capacitor 134ca face the upper and lower arm module 141. In regard to the first system, the snubber circuit element 134 is arranged on a side adjacent to the substrate centerline C within the module mounting region Rm, and the resistor 134r and the capacitor 134ca are arranged in this order from the side adjacent to the control end portion toward the side adjacent to the power end portion. In regard to the second system, the snubber circuit element 234 is arranged on a side adjacent to the substrate centerline C within the module mounting region Rm, and the resistor and the capacitor of the snubber circuit element 234 are arranged in this order from the side adjacent to the power end portion toward the side adjacent to the control end portion (see FIG. 7).

The snubber circuit element 137 is arranged adjacent to the motor relay module 147, and the capacitor 137ca and the resistor 137r of the snubber circuit element 137 are arranged in this order from the side adjacent to the upper and lower arm module 141 toward the outer end of the substrate 31 with the short side facing the upper and lower arm module 141.

The motor relay module 147 has a land 301, a drain 302, a source 303, a gate 304, drain terminals 305, source terminals 306, a gate terminal 307, a conductive clip 308, and the like, and these components are molded by a sealing portion 310.

In the motor relay module 147, the source terminals 306 are formed along one of the short sides, and the drain terminals 305 and the gate terminal 307 are formed along the other of the short sides. The motor relay module 147 is arranged such that the source terminals 306 faces the upper and lower arm module 141 and the drain terminals 305 and the gate terminal 307 face toward the outer end of the substrate 31.

The drain terminals 305 are formed integrally with the land 301. The source 303 and the source terminals 306 are connected by the conductive clip 308. The conductive clip 308 is formed of a material having sufficient electrical conductivity, such as copper, and is wider than the wire 309. The gate terminal 307 is connected to the gate 304 by a wire 309.

In the present embodiment, the drain terminal 305 and the gate terminal 307 are formed on one of the short sides of the sealing portion 310, and the source terminals 306 are formed on the other short side. While the drain electrode is formed on the back surface of the chip, the source 303 has an electrode area smaller than that of the drain 302. Therefore, the gate terminal 307 is disposed on the same side as the drain terminals 305, so that the number of the source terminals 306 can be larger than the number of the drain terminals 305, and the source 303 and the source terminals 306 are connected by the wide conductive clip 308. Thus, the resistance on the source side can be reduced.

The sealing portion 310 has a substantially rectangular shape in a plan view. The length of the long side of the sealing portion 310 is preferably 1.5 times or more the length of the short side of the sealing portion 310. It can be regarded that the length of the short side is ⅔ or less of the length of the long side. Similar to the upper and lower arm module 141, the sealing portion 310 is made of a resin having a relatively high thermal conductivity. The thermal conductivity of the sealing portion 310 is preferably 2.2 W/m·K or more. By using the resin having a high thermal conductivity as the sealing portion 310, it is possible to eliminate a surface electrode that is exposed on the surface opposite to the substrate 31 to dissipate heat, and thus it is possible to reduce the size of the motor relay module 147.

Figure 19:
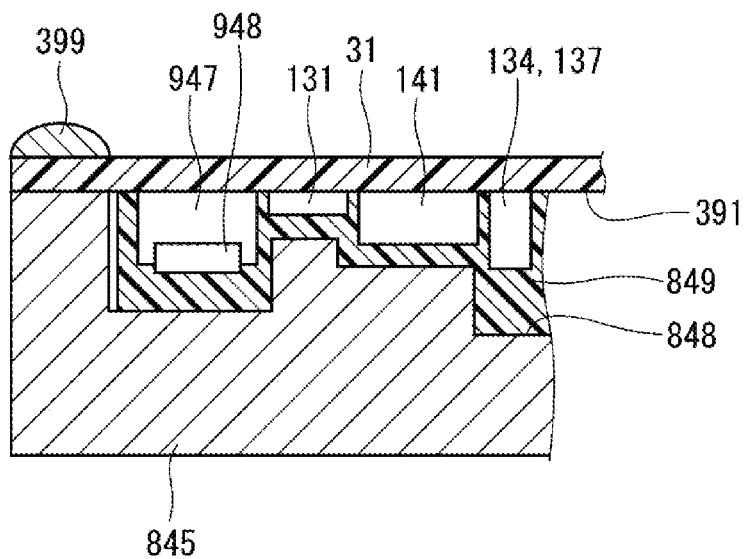
FIG. 19 is a diagram illustrating a cross-sectional view for explaining the height of components according to a reference example.

As shown in a reference example of FIG. 19, when the thermal conductivity of a molded resin of a motor relay module 947 is relatively low and a surface electrode 948 is provided, the thickness of the motor relay module 947 is larger than that of the upper and lower arm module 141. If there is a difference in the thickness of the elements mounted on the substrate 31, it is necessary to form the heat sink 845 in a shape corresponding to the elements. As a result, processing of the heat sink 845 is complicated. Further, in order to insulate the surface electrode from the heat sink 845, it is necessary to secure an insulation distance between the motor relay module 947 and the heat sink 845.

Figure 9:
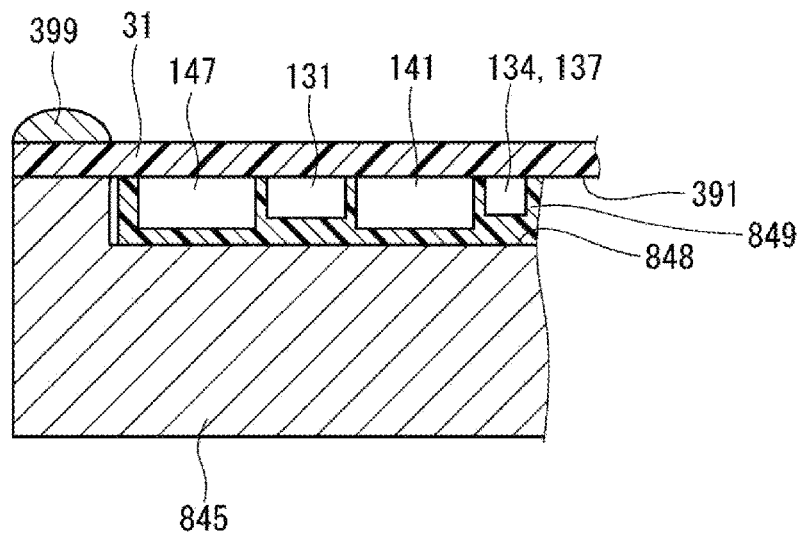
FIG. 9 is a diagram illustrating a cross-sectional view for explaining the height of components according to the first embodiment.

As shown in FIG. 9, in the present embodiment, the sealing portion 310 of the motor relay module 147 employs the resin having a high thermal conductivity, similarly to the upper and lower arm module 141, and thus a surface electrode exposed from the sealing portion 310 is not provided. Accordingly, the thicknesses of the upper and lower arm module 141 and the motor relay module 147 can be made substantially the same.

In addition, the thickness of the heat generating element that is arranged adjacent to the upper and lower arm module 141 and the motor relay module 147 and needs heat dissipation to a side opposite to the substrate 31 is smaller than that of the upper and lower arm modules 141 and the motor relay module 147. In the present embodiment, examples of the heat generating element include the shunt resistor 131 and the snubber circuit elements 134 and 137. The thicknesses of the shunt resistor 131 and the snubber circuit elements 134 and 137 are made smaller than the thicknesses of the upper and lower arm module 141 and the motor relay module 147. Accordingly, it is not necessary to secure an insulation distance from the heat sink 845, and it is possible to reduce unevenness of the heat dissipation surface 848 of the heat sink 845. As such, the processing of the heat sink 845 can be facilitated. Note that FIG. 9 is a diagram for explaining the mounting height of each element on the surface of the substrate 31 facing the heat sink 845, and does not necessarily coincide with the actual arrangement. In FIGS. 9 and 19, hatching of each element is omitted to avoid complication.

As described above, the electronic device 30 includes the upper and lower arm modules 141 to 143 and 241 to 243, the relay modules 147 to 149 and 247 to 249, the peripheral components, and the substrate 31. Hereinafter, the first system will be described, and the description of the second system will be omitted.

In each of the upper and lower arm modules 141 to 143, the upper arm element 121 to 123 and the lower arm element 124 to 126 of the same phase constituting the inverter circuit 120 are provided as one module. In each of the relay modules 147 to 149, the motor relay element 127 to 129, which is capable of switching connection and disconnection between the upper and lower arm module 141 to 143 and the motor terminal 191 to 193, is provided as an individual module for each element. The peripheral component includes at least one of the shunt resistor 131 to 133 and the snubber circuit element 134 to 139. The upper and lower arm modules 141 to 143, the motor relay modules 147 to 149, and the peripheral components are mounted on the substrate 31.

On the same surface 391 of the substrate 31, the upper and lower arm modules 141 to 143, the motor relay modules 147 to 149, and the motor terminals 191 to 193 are arranged in this order from the side adjacent to the substrate centerline C toward the outer end of the substrate 31. The shunt resistor 131 to 133 and the snubber circuit element 137 to 139, which are parts of the peripheral components, are arranged side by side with the motor relay module 147 to 149 in a region between the upper and lower arm module 141 to 143 and the motor terminal 191 to 193. Thus, the area occupied by the inverter circuit 120 and the peripheral circuit on the substrate 31 can be reduced.

In regard to the upper and lower arm module 141 to 143 and the motor relay module 147 to 149, when the length in a direction along the substrate centerline C (i.e., the y direction in FIG. 7 and the like) is defined as the width, the width of the motor relay module 147 to 149 is smaller than the width of the upper and lower arm module 141 to 143. Accordingly, it is possible to secure a space for mounting other components at a position adjacent to the motor relay module 147 to 149 in the width direction. By arranging the shunt resistor 131 to 133 and the snubber circuit element 137 to 139 in this space, the area occupied by the inverter circuit 120 and the peripheral circuit on the substrate 31 can be reduced.

The upper and lower arm modules 141 to 143 and the motor relay modules 147 to 149 have the same mounting height. Here, the "mounting height" is a height when the element is mounted on the substrate 31, and the "mounting height is the same" allows a difference to the extent that heat can be dissipated to a heat dissipation surface 848 substantially parallel to the substrate 31 and the difference in height can be absorbed by the heat dissipation gel 849 or the like. Such extent can also be allowed in the meaning of "equal to or less than the mounting height", which will be described later.

The surface of the motor relay module 147 to 149 opposite to the substrate 31 are covered with the sealing portion 310, that is, provided by the sealing portion 310. Although not shown, the surface of the upper and lower arm module 141 to 143 opposite to the substrate 31 is similarly covered with the sealing portion 310, that is, provided by the sealing portion 310. In other words, in the upper and lower arm module 141 to 143 and the motor relay module 147 to 149, metal such as a surface electrode is not exposed on the surface opposite to the substrate 31. In the present embodiment, by using the resin having high thermal conductivity for the sealing portion 310, heat is dissipated with high efficiency without exposing the surface electrode. Accordingly, since it is not necessary to secure an insulation distance from the heat dissipation surface 848, it is not necessary to form the heat dissipation surface 848 in an uneven shape, and it is possible to facilitate processing of the heat sink 845. In addition, it is not necessary to separate the upper and lower arm modules 141 to 143 and the motor relay modules 147 to 149 from the heat dissipation surface 848 by the insulation distance, which contributes to reduce the size of the driving device 1.

The mounting heights of the shunt resistors 131 to 133 and the snubber circuit elements 134 to 139 are equal to or less than those of the upper and lower arm modules 141 to 143. Accordingly, since it is not necessary to form a step on the heat dissipation surface 848, it is possible to easily process the heat sink 845.

The upper and lower arm modules 141 to 143, the motor relay modules 147 to 149, and the shunt resistors 131 to 133 are arranged so as to be able to dissipate heat to the heat sink 845 from the surfaces thereof opposite to the substrate 31. Accordingly, heat generated by energization can be appropriately dissipated.

Second Embodiment

Figure 10:
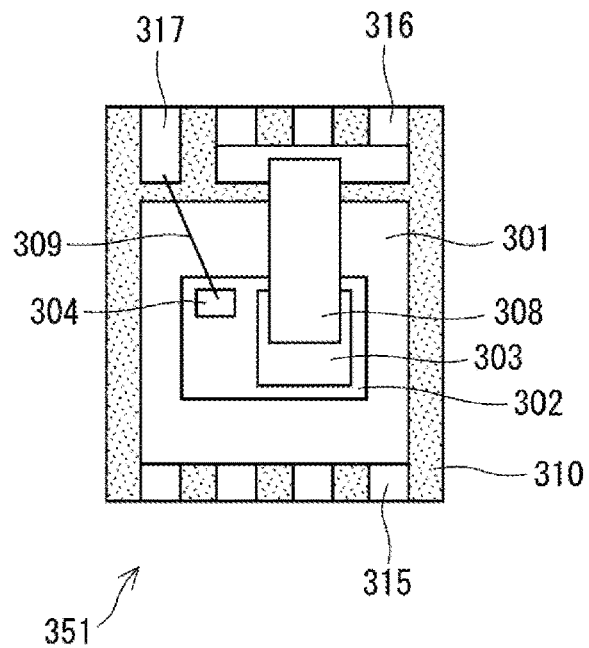
FIG. 10 is a diagram illustrating a plan view of a motor relay module according to a second embodiment.

A second embodiment is shown in FIG. 10. In the second embodiment to an eighth embodiment, the relay module is mainly different from that of the embodiment described above, and thus the difference will be mainly described.

As shown in FIG. 10, in a motor relay module 351 of the second embodiment, a land 301, a drain 302, a source 303, a gate 304, drain terminals 315, source terminals 316, a gate terminal 317, a conductive clip 308, and the like are molded by a sealing portion 310. In the motor relay module 351, the drain terminals 315 are arranged along one short side, and the source terminals 316 and the gate terminal 317 are arranged along the other short side. Also in this configuration, the similar effects to those of the embodiment described above can be achieved.

Third Embodiment

Figure 11:
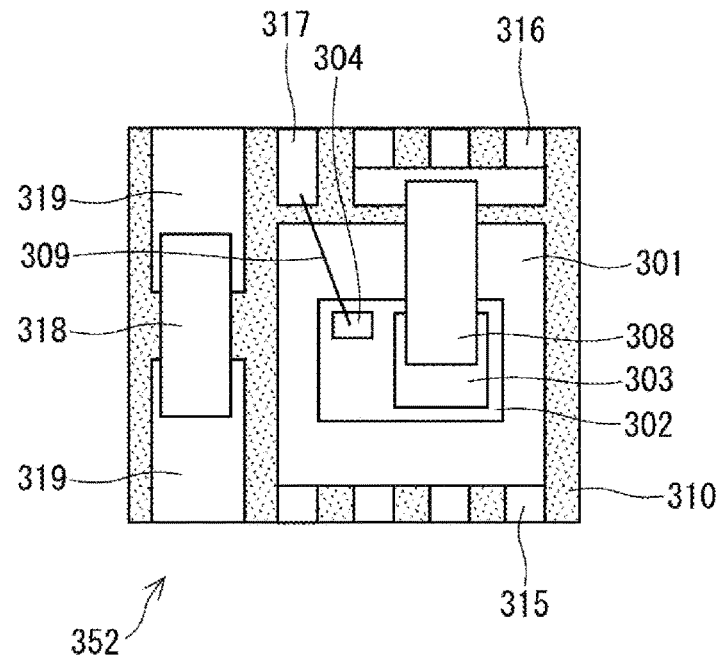
FIG. 11 is a diagram illustrating a plan view of a motor relay module according to a third embodiment.

A third embodiment is shown in FIG. 11. In a motor relay module 352 of the third embodiment shown in FIG. 11, a land 301, a drain 302, a source 303, a gate 304, drain terminals 315, source terminals 316, a gate terminal 317, a conductive clip 308, and the like are molded by a sealing portion 310. In FIG. 11, the gate terminal 317 is arranged on the same side as the source terminals 316 as in the second embodiment. Alternatively, the gate terminal 317 may be arranged on the same side as the drain terminals 315 as in the first embodiment.

In the motor relay module 352, a shunt resistor 318 and a substrate pattern 319 connected to the shunt resistor 318 are also integrally molded by the sealing portion 310. That is, in the present embodiment, the shunt resistor 318, which is an element related to current detection, is included in the motor relay module 352. In this configuration, therefore, the mounting area can be reduced as compared with the case where the shunt resistor is provided separately. In addition, the heat dissipation of the shunt resistor 318 can be improved. Further, the similar effects to those of the embodiment described above can also be achieved.

Fourth Embodiment

Figure 12:
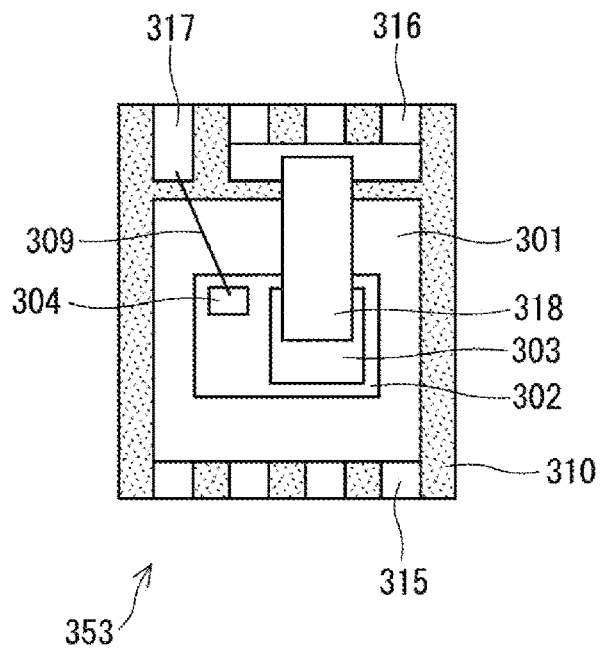
FIG. 12 is a diagram illustrating a plan view of a motor relay module according to a fourth embodiment.

A fourth embodiment is shown in FIG. 12. In a relay module 353 of the fourth embodiment shown in FIG. 12, a land 301, a drain 302, a source 303, a gate 304, drain terminals 315, source terminals 316, a gate terminal 317, a shunt resistor 318, and the like are molded by a sealing portion 310.

In the present embodiment, the source 303 and the source terminal 316 are connected by the shunt resistor 318, in place of the conductive clip 308. That is, the shunt resistor 318 has the function of the conductive clip. Accordingly, the mounting area can be further reduced. Further, the similar effects to those of the embodiment described above can also be achieved.

Fifth Embodiment

Figure 13:
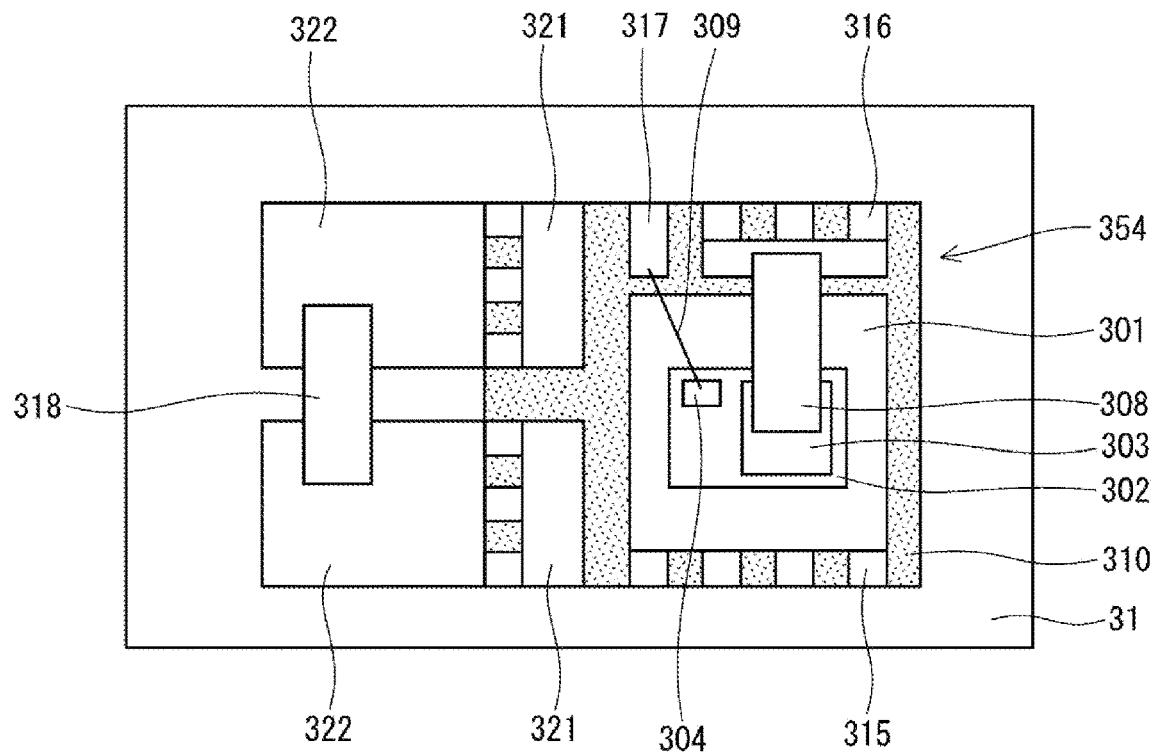
FIG. 13 is a diagram illustrating a plan view of a motor relay module according to a fifth embodiment.

A fifth embodiment is shown in FIG. 13. In a motor relay module 354 of the fifth embodiment shown in FIG. 13, a land 301, a drain 302, a source 303, a gate 304, drain terminals 315, source terminals 316, a gate terminal 317, a conductive clip 308, heat dissipation terminals 321, and the like are molded by a sealing portion 310. The heat dissipation terminals 321 are arranged along the side where the terminals 315 to 317 are not arranged, and are connected to wiring patterns 322, which are connected to the shunt resistor 318. Accordingly, the heat generated by the shunt resistor 318 can be dissipated also from the motor relay module 354 side via the wiring patterns 322 and the heat dissipation terminals 321.

The motor relay module 354 of the present embodiment includes the heat dissipation terminals 321 connected to the wiring pattern 322, which are connected to the shunt resistor 318. As a result, the heat generated by the shunt resistor 318 can be dissipated more efficiently. Further, the similar effects to those of the embodiment described above can also be achieved.

Sixth Embodiment

Figure 14:
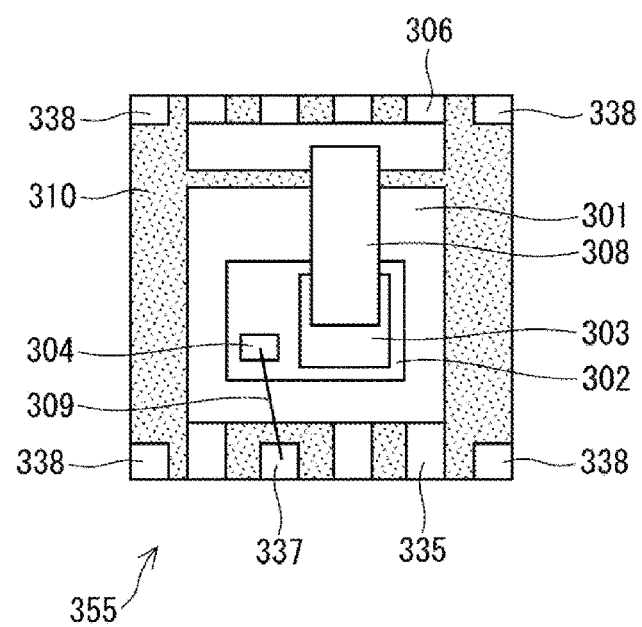
FIG. 14 is a diagram illustrating a plan view of a motor relay module according to a sixth embodiment.

A sixth embodiment is shown in FIG. 14. In a motor relay module 355 of the sixth embodiment shown in FIG. 14, a land 301, a drain 302, a source 303, a gate 304, drain terminals 335, source terminals 306, a gate terminal 337, a conductive clip 308, and non-potential terminals 338 are molded in a sealing portion 310.

In the present embodiment, the non-potential terminals 338 are arranged on both sides of the aligned source terminals 306, and on both sides of the aligned drain terminals 335 and gate terminal 337. The non-potential terminal 338 is a terminal that is not applied with a potential related to a main function such as a gate terminal, and may have a secondary function such as heat dissipation. When the terminals at the four corners of the sealing portion 310 are provided by the non-potential terminals 338, it is possible to improve the solder bonding life of the terminal to which the potential related to the main function is applied. Note that some of the corner terminals may not be the non-potential terminals.

The drain terminals 335 are arranged on both sides of the gate terminal 337. Accordingly, the solder bonding life of the gate terminal 337 can be improved. Also in the motor relay module of the embodiments described above, different terminals such as drain terminals may be arranged on both sides of the gate terminal. Further, although not shown, also in the upper and lower arm module, terminals provided at four corners of the sealing portion may be non-potential terminals.

In the present embodiment, the motor relay module 355 has the non-potential terminal 338 at least at one corner portion of the rectangular sealing portion 310. Accordingly, even if a bonding failure occurs at the corner portion, the function of the motor relay module 355 can be maintained.

In the motor relay module 355, other terminals are arranged on both sides of the gate terminal 337 related to transmission and reception of the drive signal. In other words, the gate terminal 337 is assigned to a terminal other than a corner pin, which is a terminal provided at a corner. The terminals arranged on both sides of the gate terminal 337 are not limited to the drain terminals 335, and may be non-potential terminals or the like. Accordingly, even if a bonding failure occurs at the corner portion, at least transmission and reception of the drive signal can be maintained.

Seventh Embodiment

Figure 15:
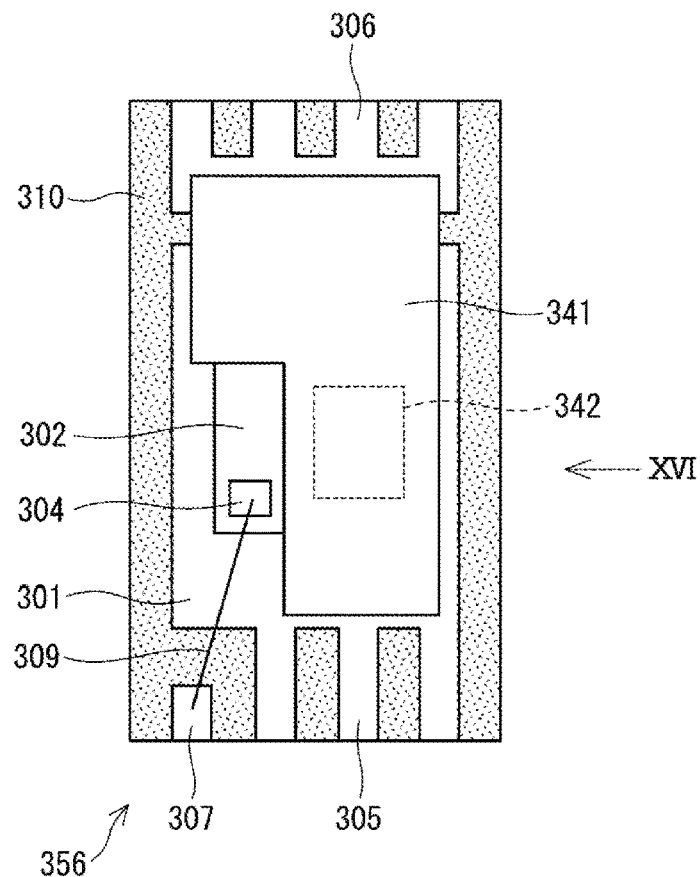
FIG. 15 is a diagram illustrating a plan view of a motor relay module according to a seventh embodiment.
Figure 16:
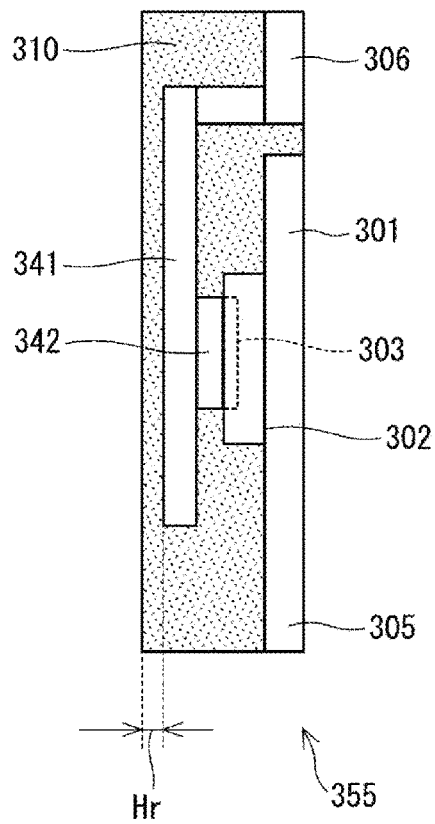
FIG. 16 is a diagram illustrating an end view of the motor relay module when viewed in a direction along an arrow XVI in FIG. 15.

A seventh embodiment is shown in FIGS. 15 and 16. In a motor relay module 356 of the seventh embodiment shown in FIGS. 15 and 16, a land 301, a drain 302, a source 303, a gate 304, drain terminals 305, source terminals 306, a gate terminal 307, a large conductive clip 341, and the like are molded by a sealing portion 310.

In the motor relay module 356, the source 303 and the source terminals 306 are connected by the large conductive clip 341. For example, while the conductive clip 308 of the first embodiment is narrower than the source 303 (see FIG. 8), the large conductive clip 341 is wider than the source 303 and is arranged so as to cover the entire surface of the source 303. In the present embodiment, the large conductive clip 341 has a flat plate shape extending from the source terminals 306 toward the drain terminal 305, and has a cutout so as not to overlap with the gate 304.

As shown in FIG. 16, the large conductive clip 341 has a protrusion 342 that protrudes toward the source 303 and is connected to the source 303. The minimum thickness Hr, which is the thickness of the sealing portion 310 at the location where the large conductive clip 341 is provided, is larger than the filler diameter in the mold resin to enable resin molding. In addition, the minimum thickness Hr is set to a size capable of securing insulation equal to or greater than the withstand voltage of switching.

By using the large conductive clip 341 for the connection between the source 303 and the source terminals 306, the resistance on the source side can be reduced. Further, the similar effects to those of the embodiment described above can also be achieved.

Eighth Embodiment

Figure 17:
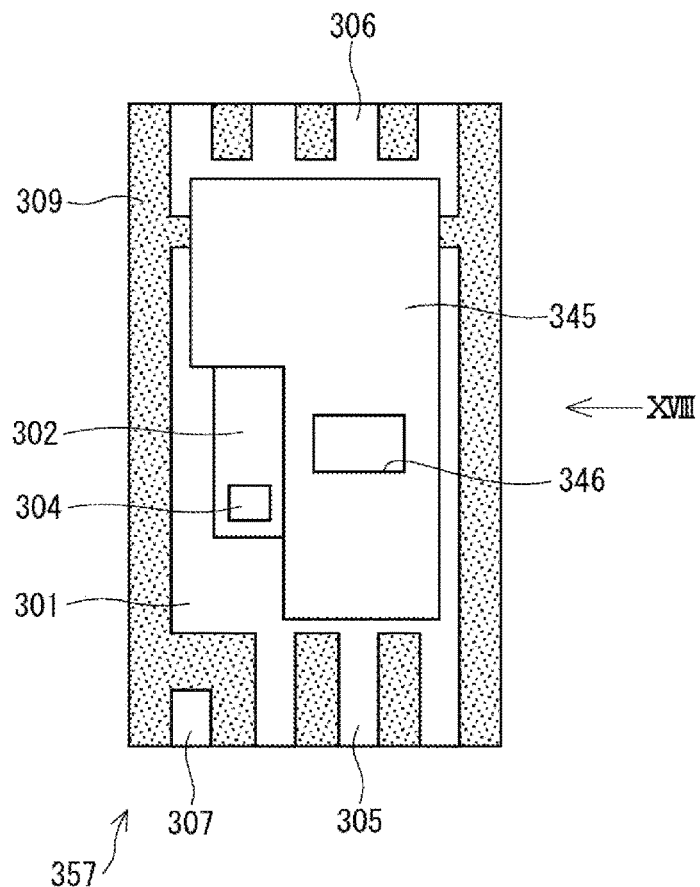
FIG. 17 is a diagram illustrating a plan view of a motor relay module according to an eighth embodiment.
Figure 18:
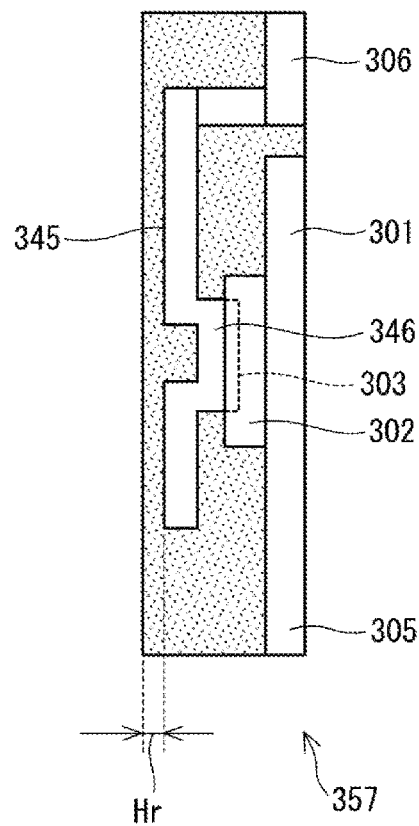
FIG. 18 is a diagram illustrating an end view of the motor relay module when viewed in a direction along an arrow XVIII in FIG. 17.

An eighth embodiment is shown in FIGS. 17 and 18. In the eighth embodiment, a large conductive clip 345 is different from that of the seventh embodiment, and thus this difference will be mainly described. As shown in FIGS. 17 and 18, in a motor relay module 357 of the present embodiment, the large conductive clip 345 has a uniform plate thickness and has a recess 346 at which the large conductive clip 345 is in contact with the source 303. Accordingly, the large conductive clip 345 can be formed using a material having a uniform plate thickness. Further, the similar effects to those of the embodiment described above can also be achieved.

In the embodiments described above, the main substrate 31 corresponds to a "substrate", the motor relay modules 147 to 149, 247 to 249, and 351 to 357 correspond to "relay modules", the shunt resistors 131 to 133, 231 to 233, and 318 correspond to "current detection elements" or "peripheral components", the snubber circuit elements 134 to 139 and 234 to 239 correspond to "noise removal elements" or "peripheral components", the motor terminals 191 to 193 correspond to "output terminals", and the gate terminal 337 corresponds to a "drive signal terminal".

Other Embodiments

In the embodiment described above, in all the relay modules, the shunt resistor and the snubber circuit element are arranged side by side as peripheral components. As another embodiment, the peripheral components may not be arranged side by side in some motor relay modules. As further another embodiment, the shunt resistor or the snubber circuit element may not be disposed side by side with the motor relay module. The peripheral components may be components other than the shunt resistor and the snubber circuit element. In addition, all of the relay modules do not need to have the same shape, and some of the relay modules may have a different shape from the other modules.

In the embodiment described above, two systems of inverter circuits, motor relay modules, and the like are mounted on the substrate. As another embodiment, the number of systems is not limited to two, and may be one or three or more. In the embodiments described above, the electronic device is applied to a motor drive circuit. As another embodiment, the electronic device may be applied to a circuit other than the motor drive circuit, such as a power generation circuit or a DC-DC converter.

In the embodiment described above, the inverter circuit and the microcomputer are mounted on the same substrate. As another embodiment, the inverter circuit and an electronic component related to control such as a microcomputer may be mounted on different substrates. As further another embodiment, the sub substrate on the connector side may be omitted, and only one substrate may be provided. Not only the number of the substrate but also the configuration of the drive circuit may not be limited to the examples described above, and may be different from those described above.

In the embodiments described above, the steering device is the electric power steering device. As other embodiments, the steering device may be a steer-by-wire device, and the driving device may be used as a steering device for steering the wheels or as a reaction force device for applying a reaction force to the steering wheel. Also, the driving device may be applied to devices other than the steering device. The present disclosure is not limited to the embodiments described above, and can be implemented in various forms without departing from the spirit of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. An electronic device comprising:
a substrate;
an upper and lower arm module mounted on the substrate, and including an upper arm element and a lower arm element, the upper arm element and the lower arm element providing a same phase of an inverter circuit and being configured as one module;
a relay module mounted on the substrate, and including one relay element that switches connection and disconnection between the upper and lower arm module and an output terminal that is disposed on the substrate and is electrically connected to a connection point between the upper arm element and the lower arm element via the relay module; and
a peripheral component mounted on the substrate and including at least one of a current detection element and a noise removal element, wherein
the upper and lower arm module, the relay module and the output terminal are arranged in this order along a direction from a centerline of the substrate toward an outer end of the substrate on a same surface of the substrate, and
at least a part of the peripheral component is arranged side by side with the relay module in a region between the upper and lower arm module and the output terminal, wherein the at least a part of the peripheral component is arranged to overlap with the relay module in a direction parallel to the centerline.

2. The electronic device according to claim 1, wherein the relay module has a width smaller than that of the upper and lower arm module, the width being defined in a direction along the centerline of the substrate.

3. An electronic device comprising:
a substrate;
an upper and lower arm module mounted on the substrate, and including an upper arm element and a lower arm element, the upper arm element and the lower arm element providing a same phase of an inverter circuit and being configured as one module;
a relay module mounted on the substrate, and including one relay element that switches connection and disconnection between the upper and lower arm module and an output terminal that is disposed on the substrate and is electrically connected to a connection point between the upper arm element and the lower arm element via the relay module; and
a peripheral component mounted on the substrate and including at least one of a current detection element and a noise removal element, wherein the upper and lower arm module, the relay module and the output terminal are arranged in this order along a direction from a centerline of the substrate toward an outer end of the substrate on a same surface of the substrate,
at least a part of the peripheral component is arranged side by side with the relay module in a region between the upper and lower arm module and the output terminal, and
the upper and lower arm module and the relay module have a same mounting height with respect to the surface of the substrate.

4. An electronic device comprising:
a substrate;
an upper and lower arm module mounted on the substrate, and including an upper arm element and a lower arm element, the upper arm element and the lower arm element providing a same phase of an inverter circuit and being configured as one module;
a relay module mounted on the substrate, and including one relay element that switches connection and disconnection between the upper and lower arm module and an output terminal that is disposed on the substrate and is electrically connected to a connection point between the upper arm element and the lower arm element via the relay module; and
a peripheral component mounted on the substrate and including at least one of a current detection element and a noise removal element, wherein the upper and lower arm module, the relay module and the output terminal are arranged in this order along a direction from a centerline of the substrate toward an outer end of the substrate on a same surface of the substrate, at least a part of the peripheral component is arranged side by side with the relay module in a region between the upper and lower arm module and the output terminal, and each of the upper and lower arm module and the relay module has a sealing portion that defines an end surface of the corresponding module on a side opposite to the substrate.

5. The electronic device according to claim 1, wherein the peripheral component has a mounting height equal to or less than a mounting height of the upper and lower arm module with respect to the surface of the substrate.

6. The electronic device according to claim 1, further comprising:

a heat sink disposed to face the upper and lower arm module, the relay module and the current detection element on a side opposite to the substrate so as to dissipate heat from the upper and lower arm module, the relay module and the current detection element.

7. The electronic device according to claim 1, wherein at least one of the upper and lower arm module and the relay module has a sealing portion that has a rectangular shape in a plan view, and a non-potential terminal that is disposed at a corner of the rectangular shape of the sealing portion.

8. The electronic device according to claim 1, wherein the relay module includes a drive signal terminal related to transmission and reception of a drive signal, and different terminals different from the drive signal terminal, the drive signal terminal is arranged between the different terminals.

9. The electronic device according to claim 1, wherein the relay module has a heat dissipation terminal that is connected to a wiring pattern on which the current detection element is mounted.

10. The electronic device according to claim 1, wherein the relay module includes a current detection element therein.

* * * * *